Sept. 10, 1957 D. E. GRISWOLD 2,805,774
LIQUID SEPARATION APPARATUS
Filed April 20, 1953 8 Sheets-Sheet 2

INVENTOR.
David E. Griswold
BY
Barent Thomas
ATTORNEYS

INVENTOR.
David E. Griswold
BY
Baron & Thomas
ATTORNEYS

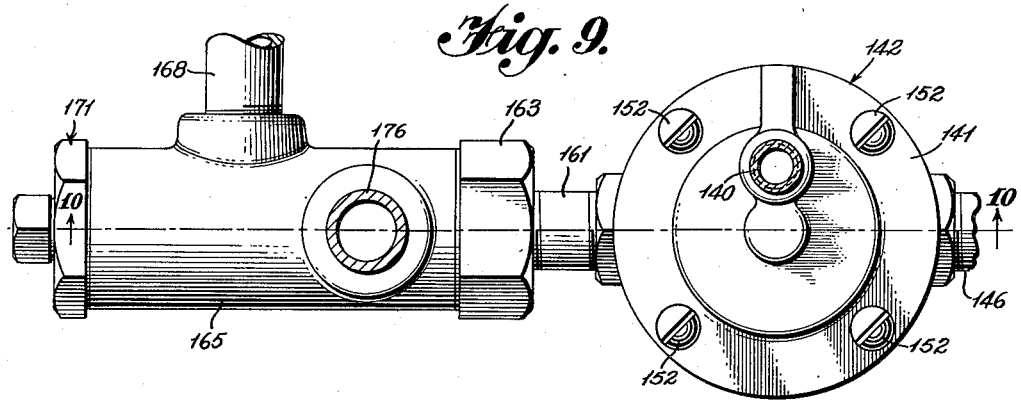
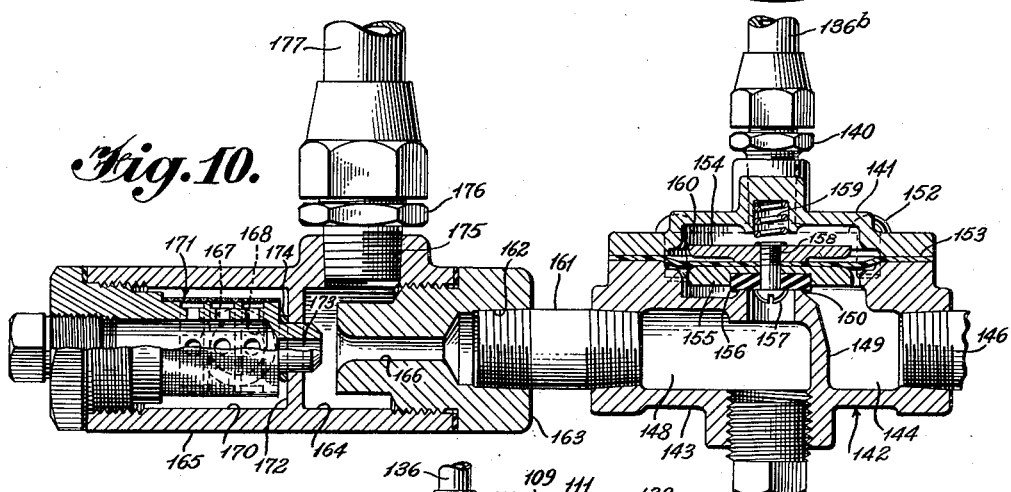
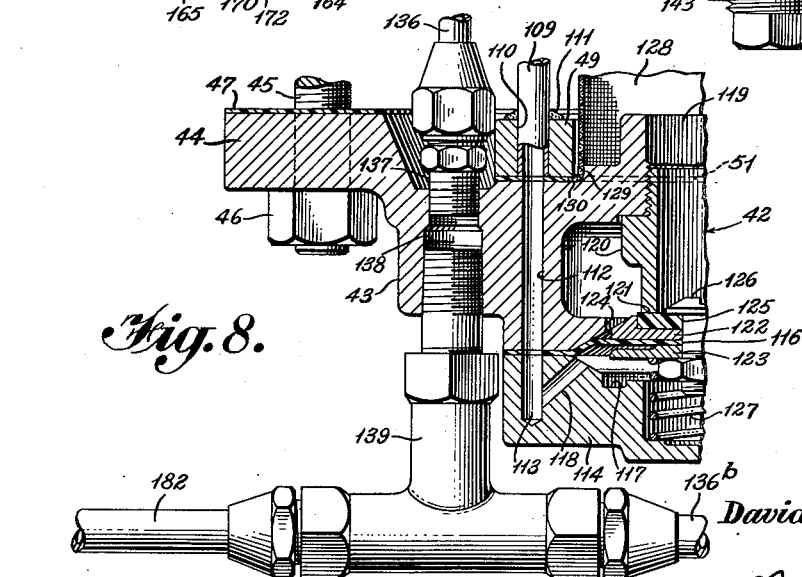

Sept. 10, 1957 D. E. GRISWOLD 2,805,774
LIQUID SEPARATION APPARATUS
Filed April 20, 1953 3 Sheets-Sheet 6
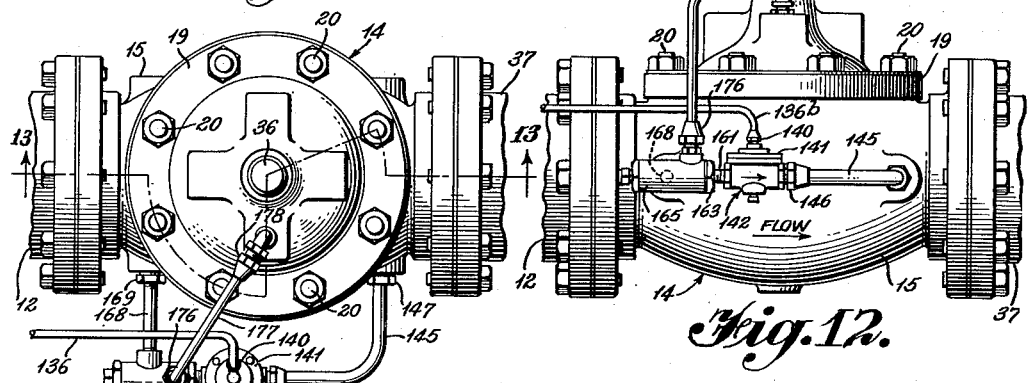
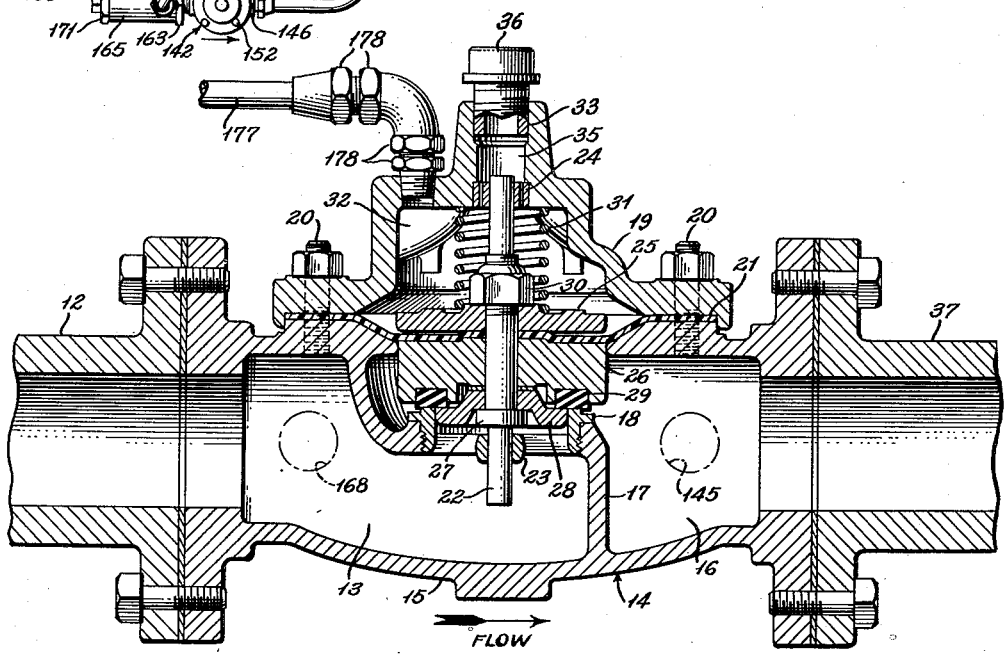
INVENTOR.
David E. Griswold
BY
Bacon + Thomas
ATTORNEYS

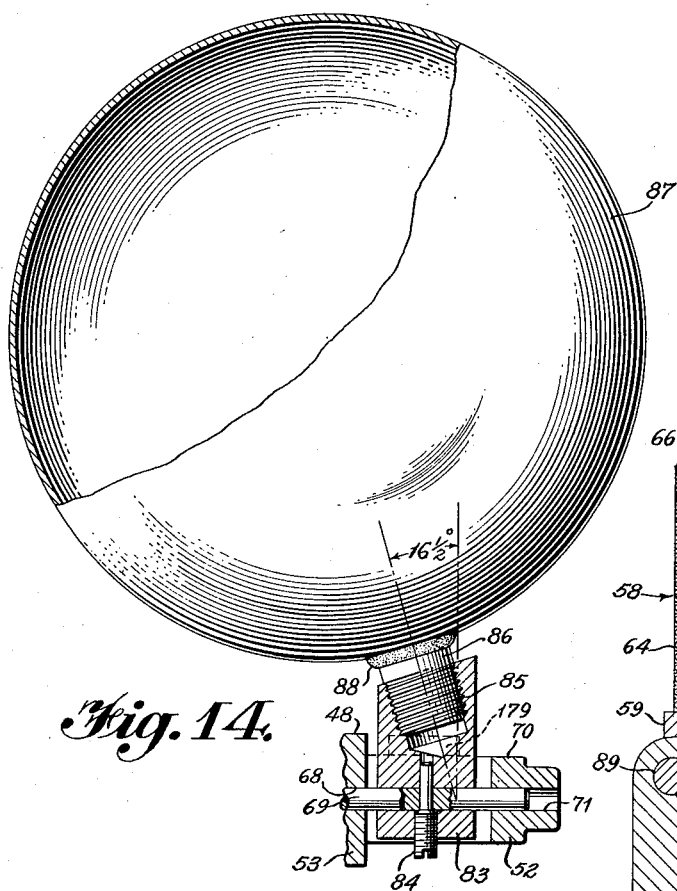
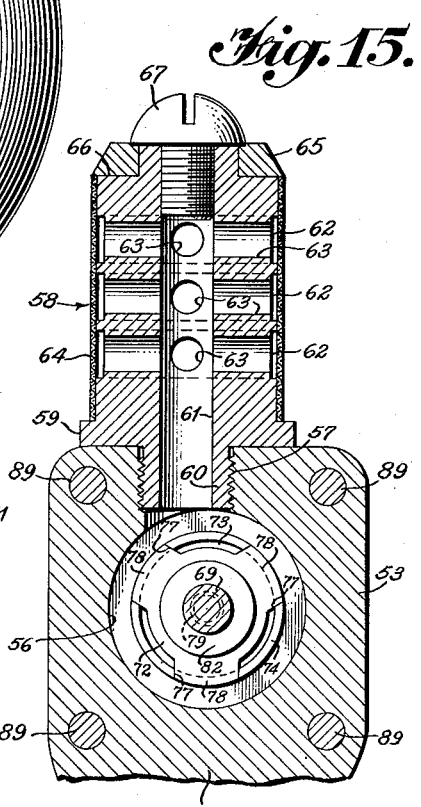
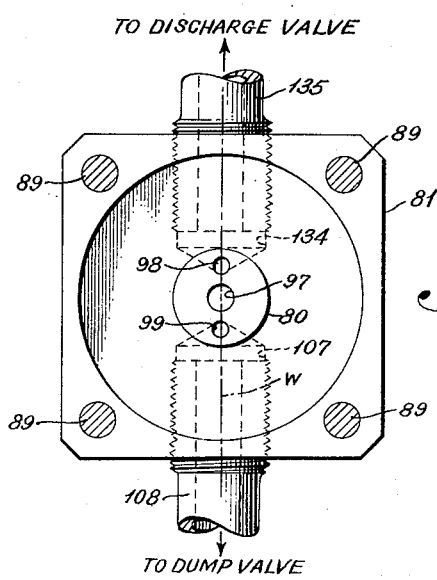

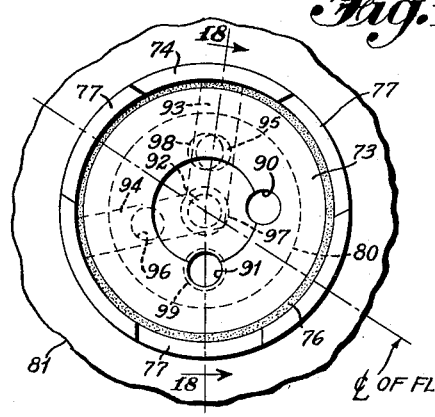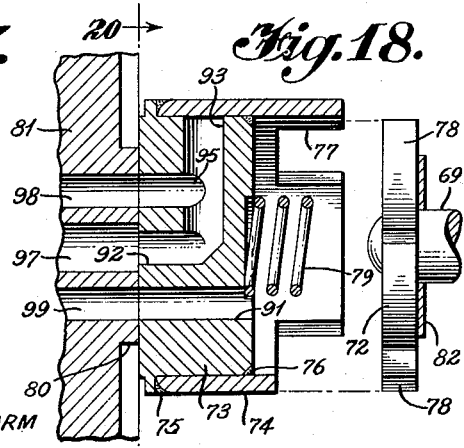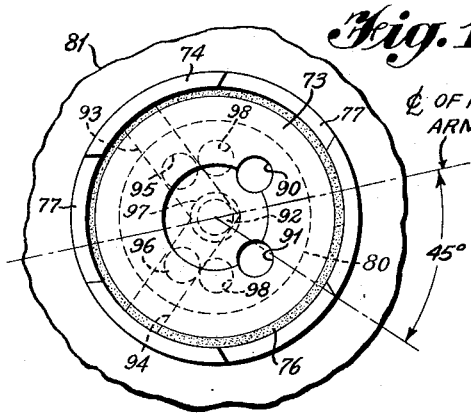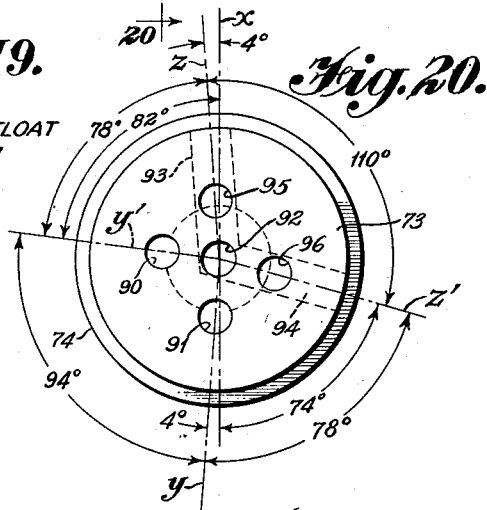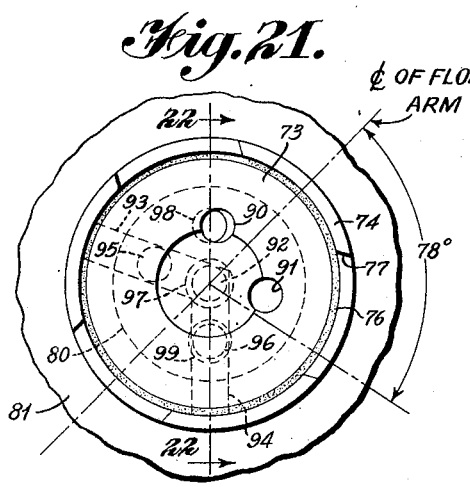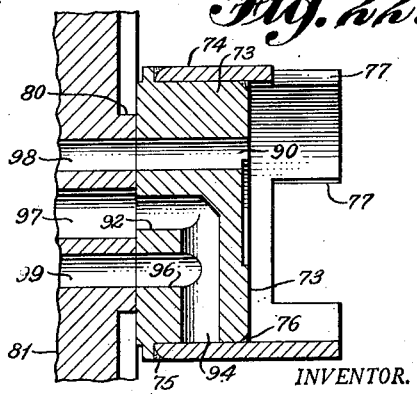
INVENTOR.
David E. Griswold
BY
Bacon + Thomas
ATTORNEYS

United States Patent Office 2,805,774
Patented Sept. 10, 1957

2,805,774
LIQUID SEPARATION APPARATUS

David E. Griswold, San Marino, Calif., assignor to Donald G. Griswold, Alhambra, Calif.

Application April 20, 1953, Serial No. 349,788

15 Claims. (Cl. 210—110)

The present invention relates to apparatus useful for separating liquids and/or liquids and gases having different specific gravities. By way of illustrating one operative embodiment of the invention, the present disclosure refers specifically to the separation of two immiscible liquids, such as, gasoline and water. However, it is to be understood that the apparatus is not limited in its use to any particular liquids, nor to any particular mixture of gases and liquids.

The principal object of the invention is to provide efficient, automatically operable apparatus for separating fluids at a rapid rate.

Another object is to provide automatic separating apparatus for safely handling fluids having different specific gravities, the lighter of which may be highly inflammable.

Another object is to provide an automatic, extremely sensitive control for effecting separation of liquids in a liquid separation apparatus that will avoid discharging the heavier component with the lighter, even though an excess of the heavy component should be suddenly introduced into the apparatus.

Still another object is to provide automatic liquid separation apparatus that is hydraulically controlled and in which the liquid under pressure within the apparatus is utilized as the operating pressure fluid for controlling a discharge valve for the lighter component and for controlling a dump valve for the heavier component.

A further object is to provide automatic liquid separating apparatus having a control unit contained within the separating apparatus itself, so that the control unit is protected from possible damage.

A further object is to provide fluid separating apparatus wherein a pump, which pumps the fluid through the apparatus, is automatically shut down when an excess of the heavier fluid is present in the apparatus.

A further object is to provide fluid separating apparatus wherein the pump supplying fluid to the apparatus is automatically shut down along with the closing of a valve controlling the discharge of the lighter component from the apparatus.

A still further object is to provide fluid separating apparatus wherein the pump supplying fluid to the apparatus is automatically shut down along with the opening of a dump valve for draining the heavier component from the apparatus.

A still further object is to provide a rotary pilot valve control for liquid separating apparatus wherein the number of ports, and the area of the face of the pilot disc, are reduced to a minimum.

A still further object is to provide a sub-assembly for use in liquid separating apparatus comprising a float controlled pilot valve and a dump valve adapted to be readily mounted as a unit in the lower end of a sump chamber of the apparatus.

Briefly, the invention comprises a fluid separating apparatus including a casing and an inlet into which the mixture of immiscible liquids is pumped under pressure; an outlet for the lighter liquid; and means between said inlet and outlet for effecting gravity separation and filtering of the fluids. The separator casing includes a depending leg adjacent the discharge end thereof which serves as a sump or chamber in which the heavy liquid is adapted to collect by gravity. In the present construction, the automatic control means for the apparatus is located in this sump.

A fluid pressure operable discharge valve for the light liquid is connected with the outlet of the separator casing; and a fluid pressure operable dump valve for the heavy liquid is associated with a pilot valve and incorporated as a part of the control unit sub-assembly, for draining the heavy liquid from the sump. A short-armed ball float is disposed in the sump and is of such character that it will sink in the light liquid and be buoyantly supported by the heavy liquid. The pilot valve is, of course, disposed in the sump and operated by the float so that it is actuated in accordance with variations in the level of the heavy liquid in the sump. Operating fluid under pressure is conveniently taken from the sump and passes through a strainer and directly into the pressure chamber in the housing of the pilot valve. A first conduit connects the pilot valve with the fluid pressure operable dump valve for the heavy component; a second conduit serves as an exhaust conduit for operating fluid, and preferably connects the pilot valve with the outlet of the dump valve for discharge to the atmosphere or to waste; and a third conduit (comprising two sections) connects the pilot valve with a pressure responsive control valve associated with a fluid pressure operable valve controlling the discharge of the lighter component.

The pilot valve itself includes a rotatable, ported pilot disc, a ported seat for the pilot disc, and a fluid distribution base; the pilot disc, seat and base having ports and passages arranged so that: (1) when the level of the heavy liquid in the sump or float chamber is low, the float is in its "down" position and orients the pilot disc so that the discharge valve for the light liquid is open and the dump valve for the heavy liquid is closed; (2) as the level of the heavy liquid in the float chamber rises, the float is correspondingly raised and the pilot disc is moved through an intermediate position in which none of its ports register with any of the ports in the base of the pilot valve so that the discharge valve remains open and the dump valve remains closed; eventually, of course, the float rises to an intermediate position in which the dump valve is permitted to open, the porting of the pilot disc being such that the dump valve starts to open at an angular position of the float arm about 8° in advance of the start of the closing of the discharge valve; and (3) when the level of the heavy liquid in the float chamber gradually rises above a predetermined maximum, or if a sudden excess of the heavy liquid is introduced into the separator casing so as to suddenly raise the level of the heavy liquid in the sump or float chamber above the predetermined maximum, the float will position the pilot disc so that the discharge valve is immediately closed while the dump valve remains open, and moreover, operating fluid is delivered to a normally closed pressure switch controlling the operation of the pump, thereby effecting opening of the switch and interrupting the driving of the pump so that the supply of fluid to the separator casing is automatically stopped.

When the apparatus is employed to separate two immiscible liquids, the liquid under pressure in the apparatus is utilized as the operating medium for the discharge and dump valves. The operating fluid used to control the discharge valve may be used for this purpose alone, or for actuating the pressure responsive pump control switch, or simultaneously for both purposes. The use of the working liquid, be it gasoline or some other liquid, as the operating medium for the valves (and pump control) eliminates the necessity for an extraneous source of fluid under pressure, thus making the unit self-contained.

Other objects and features of the invention will be apparent from the following description taken in conjunction with the accompanying drawings, in which:

Fig. 8 is a fragmentary vertical sectional view taken on the line 8—8 of Fig. 5 and particularly illustrating the ports through which operating fluid is supplied to the pressure chamber of the dump valve;

Fig. 9 is a plan view of the auxiliary control valve and the strainer associated with the discharge valve;

Fig. 10 is a vertical sectional view through the auxiliary control valve and strainer taken on the line 10—10 of Fig. 9;

Fig. 11 is a plan view showing the discharge valve and the auxiliary control valve and strainer associated therewith;

Fig. 12 is a side elevational view of the discharge valve, etc., shown in Fig. 11;

Fig. 13 is a vertical sectional view through the discharge valve taken on the line 13—13 of Fig. 11;

Fig. 14 is a horizontal sectional view through the mounting arm for the float taken on the line 14—14 of Fig. 4;

Fig. 15 is an enlarged vertical sectional view through the strainer, etc., for the pilot valve taken on the line 15—15 of Fig. 4;

Fig. 16 is a vertical sectional view taken on the line 16—16 of Fig. 4 and particularly illustrating the porting of the fluid distribution base of the pilot valve;

Fig. 17 is a diagrammatic view illustrating the position of the pilot disc relative to the pilot seat corresponding to the low position of the float, wherein the discharge valve is open and the dump valve is closed;

Fig. 18 is a fragmentary sectional view through the pilot disc and fluid distribution base taken on the line 18—18 of Fig. 17;

Fig. 19 is a view similar to Fig. 17 but showing the position of the pilot disc relative to its seat corresponding to an intermediate position of the float wherein the discharge valve is still open and the dump valve is still closed;

Fig. 20 is an elevational view of the face of the pilot disc particularly illustrating the relative position of the ports thereof;

Fig. 21 is a view similar to Fig. 17 but shows the position of the pilot disc relative to its seat corresponding to the maximum "up" position of the float, wherein the discharge valve is closed, the dump valve is open and the pump is shut down; and Fig. 22 is a sectional view taken on the line 22—22 of Fig. 21.

Figure 1:
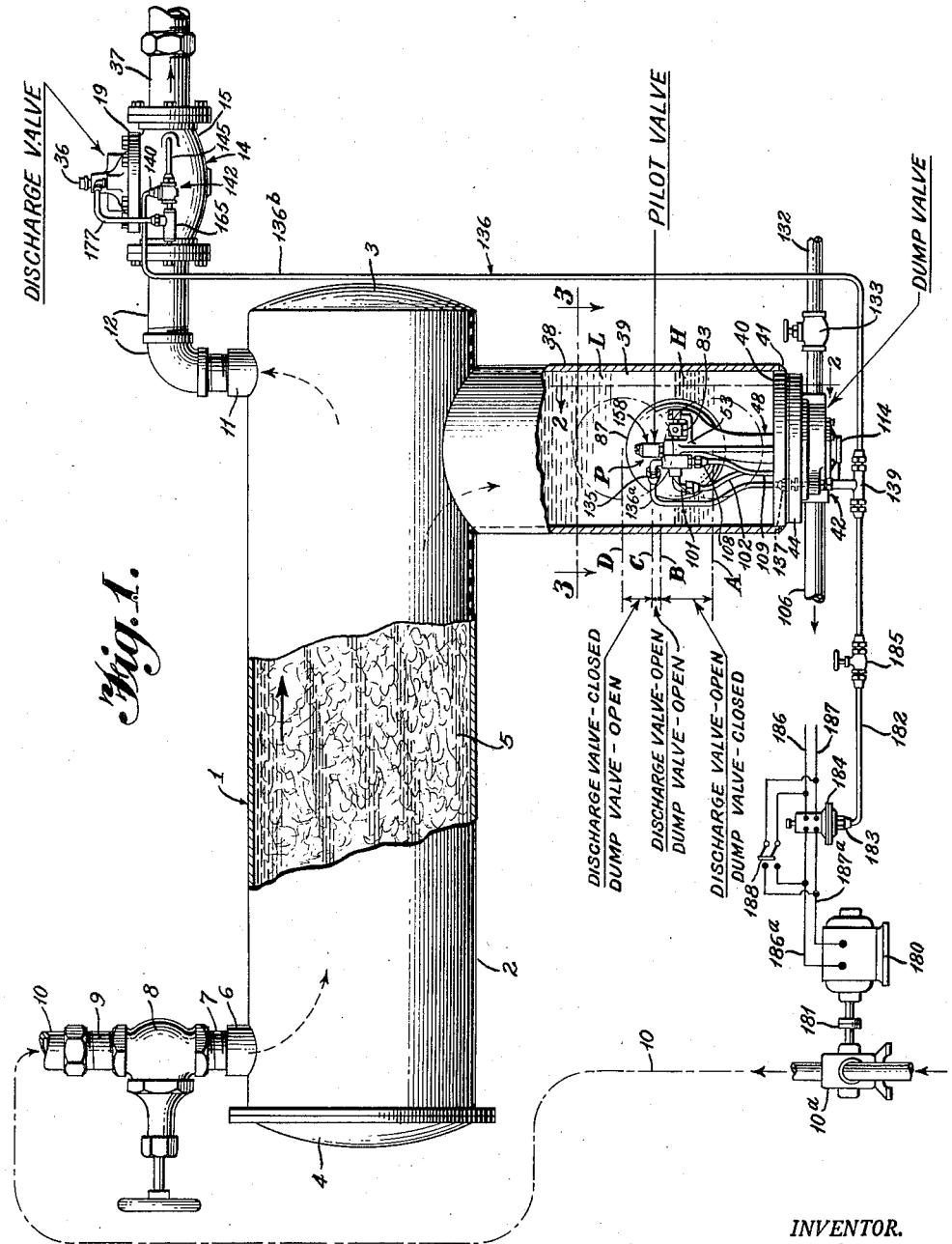
Fig. 1 is a diagrammatic view, partly in section, of an automatic fluid separation apparatus embodying the principles of the present invention.

Referring now to Fig. 1 of the drawings, the fluid separation apparatus is generally identified by the numeral 1 and includes an elongated, preferably horizontally disposed casing 2 closed at one end by a head 3 and closed at its opposite end by a removable cover 4. The casing 2 contains a replaceable filter element 5 of "Excelsior" or any other suitable material which is effective as a filtering medium for removing foreign matter from the fluids being separated and which is also effective for producing gravity separation of any immiscible liquids passing through said casing, permitting of the liquid L of the lower specific gravity to rise and the liquid H of the higher specific gravity to pass downwardly to the lowest portion of said casing.

The casing 2 has an inlet 6 in the upper part thereof adjacent the head 4. A pipe nipple 7 has one end thereof threaded into the inlet 6 and its opposite end connected with the outlet of a manually operable shut-off valve 8. A pipe nipple 9 has one end thereof threaded into the inlet side of the valve 8 and its opposite end is detachably coupled with a supply conduit 10. The supply conduit 10 is adapted to be connected with a source of mixed, immiscible liquids to be separated, for example, gasoline contaminated with ordinary water, sea water, or other liquid having a greater specific gravity than gasoline. The mixed liquids are introduced into the conduit 10 by a pump 10$^a$ under sufficient pressure to force the liquids through the filter element 5 at a rapid rate. The pump 10$^a$ is adapted to be automatically shut off in the event of the sudden introduction of a large amount of the heavier liquid H which might otherwise be discharged from the apparatus with the lighter component L, unless operation of the apparatus were discontinued, all as will be explained more fully hereinafter.

The casing 2 is also provided with an outlet 11 in the upper part thereof adjacent the head 3, through which the liquid L of lower specific gravity may pass from the casing. The outlet 11 is connected by suitable pipe fittings, generally indicated by the numeral 12, with the inlet chamber 13 of a hydraulically or fluid pressure operable discharge valve 14. As is best shown in Fig. 13, the valve 14 includes a body 15 having an outlet chamber 16 separated from the inlet chamber 13 by a partition 17 having a valve seat 18 mounted thereon. A cover 19 is secured to the body 15 by means of a plurality of studs 20, a flexible diaphragm 21 being interposed between said valve body and cover. A valve stem 22 extends through the diaphragm 21 and is guided at its lower end in a boss 23 carried by the valve seat 18 and is guided at its upper end in a bushing 24 mounted in the cover 19. Diaphragm supporting washers 25 and 26 are disposed above and below the diaphragm 21 and have the valve stem 22 extending therethrough. A shoulder 27 is provided on the valve stem 22 and forms an abutment for a disc 28 that is engaged with and retains an annular sealing ring 29 in position on the washer 26. The sealing ring 29 is adapted to engage the seat 18 to shut off flow through the valve 14. A nut 30 is mounted upon a threaded portion of the valve stem 22 above the washer 25 and secures the disc 28 and the washers 25 and 26 in assembled relation with the diaphragm 21. A compression spring 31 is disposed in a pressure chamber 32 provided in the cover 19 and has its lower end engaged with the washer 25 and its upper end engaged with the cover 19 and normally tends to urge the valve stem 22 toward closed position against line pressure, whereby to effect automatic closing of the main valve whenever the discharge pressure is insufficient to open said valve. The cover 19 has one end of a pipe nipple 33 mounted in an opening 35 axially aligned with the valve stem 22, and a pipe cap 36 is mounted upon the opposite end of said pipe nipple 33 for effecting closure thereof. A discharge pipe 37 is connected with the outlet chamber 16 of the valve 14 for discharge of the lighter liquid into a storage tank or other receptacle (not shown). The manner in which the supply and exhaust of operating fluid to and from the pressure chamber 32 of the discharge valve 14 is controlled, will be described later.

Referring now to Fig. 1, the casing 2 is provided with a depending cylindrical leg 38 located adjacent the head 3 and constructed to provide a chamber 39 which serves the dual purpose of a float chamber, and a sump in which the heavy liquid can accumulate. The leg 38 is open at its upper end and communicates directly with the interior of the casing 2. The opening at the lower end of said leg, forming the outlet end for said chamber, is partially closed by a ring 40 welded thereto as indicated at 41. The ring 40 serves as a mounting for a sub-assembly including a pilot valve P and a dump valve generally identified by the numeral 42. The ring 40 is welded to the leg 38 as a manufacturing expedient, it being obvious that an integral flange at the lower end of said leg would serve as well.

Figure 2:
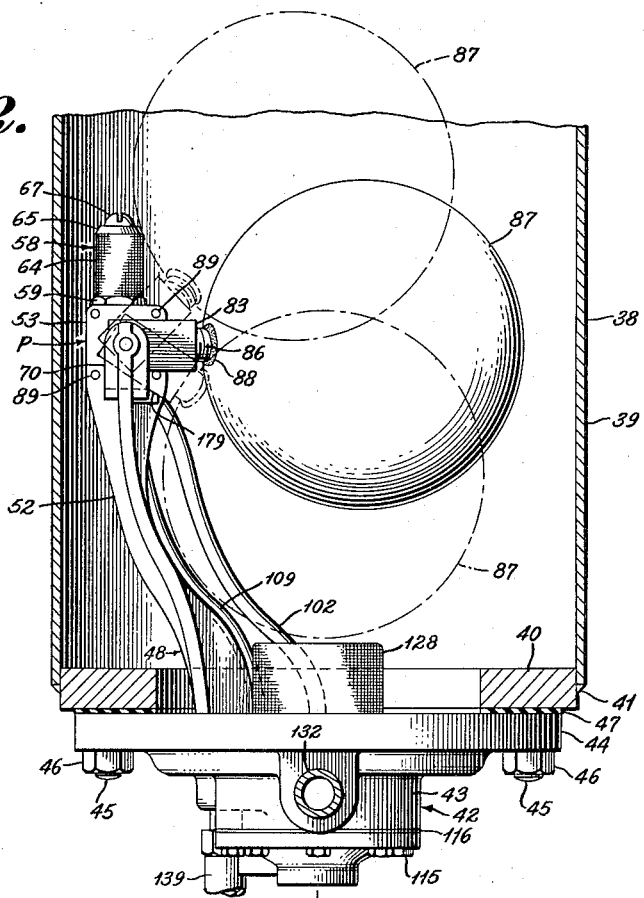
Fig. 2 is a fragmentary view illustrating the dump valve, pilot valve and float assembly as viewed on the section line 2—2 of Fig. 1.
Figure 3:
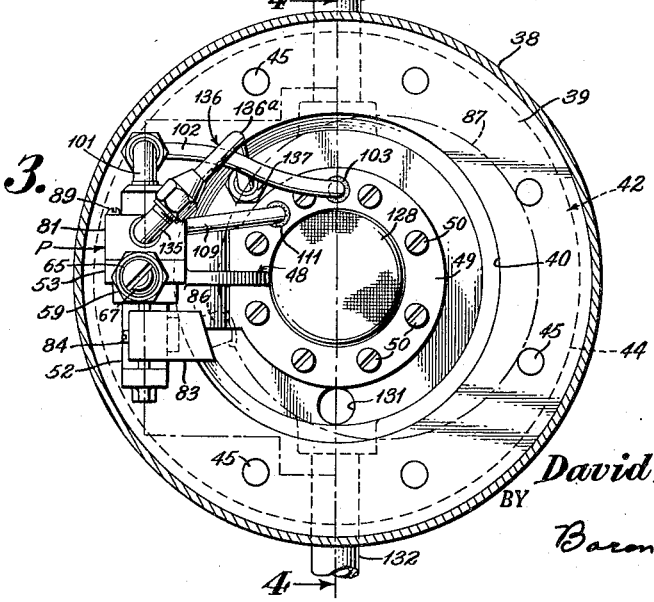
Fig. 3 is a sectional plan view taken on the line 3—3 of Fig. 1.
Figure 4:
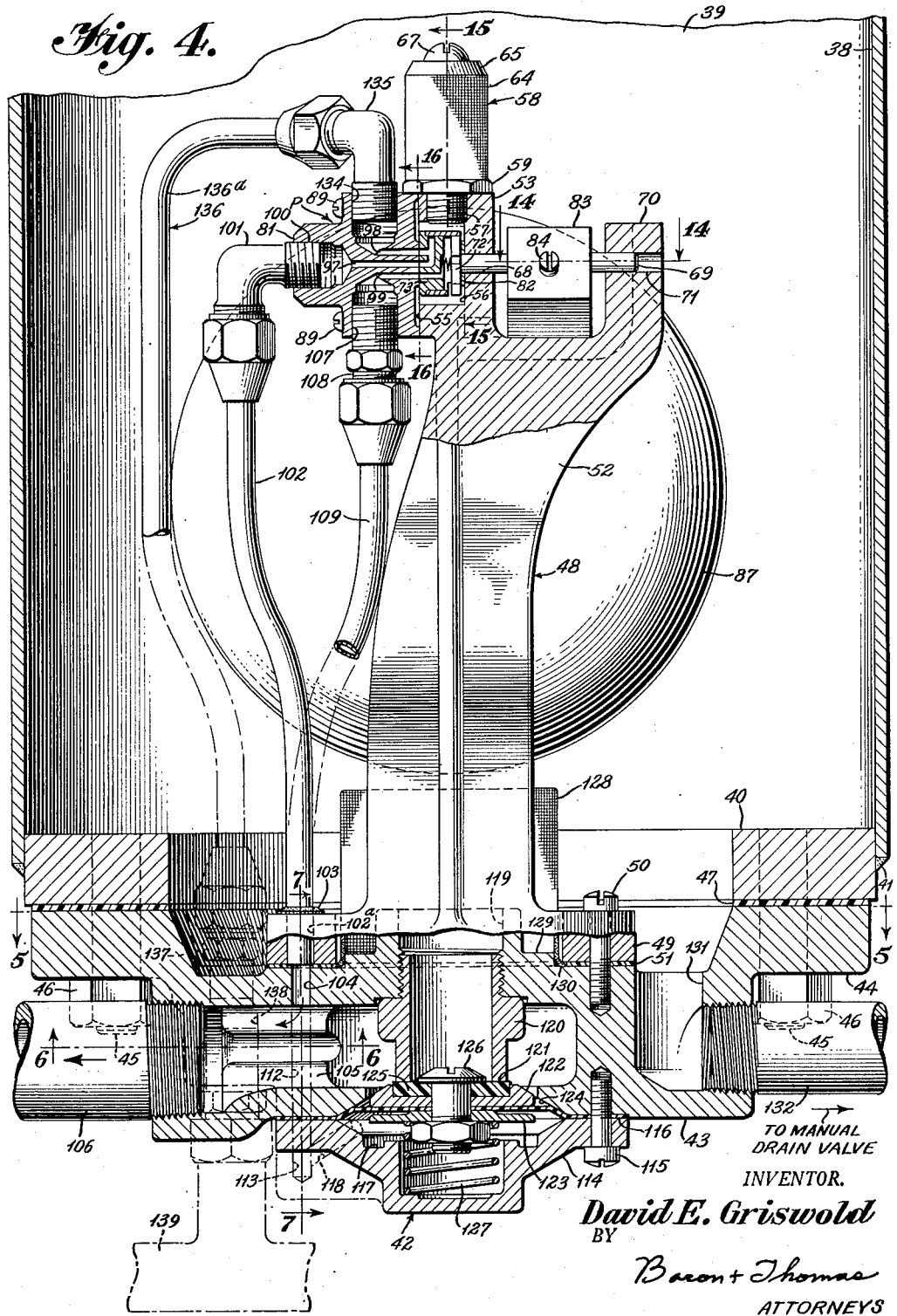
Fig. 4 is an enlarged sectional view through the pilot valve and dump valve taken on the staggered line 4—4 of Fig. 3.
Figure 5:
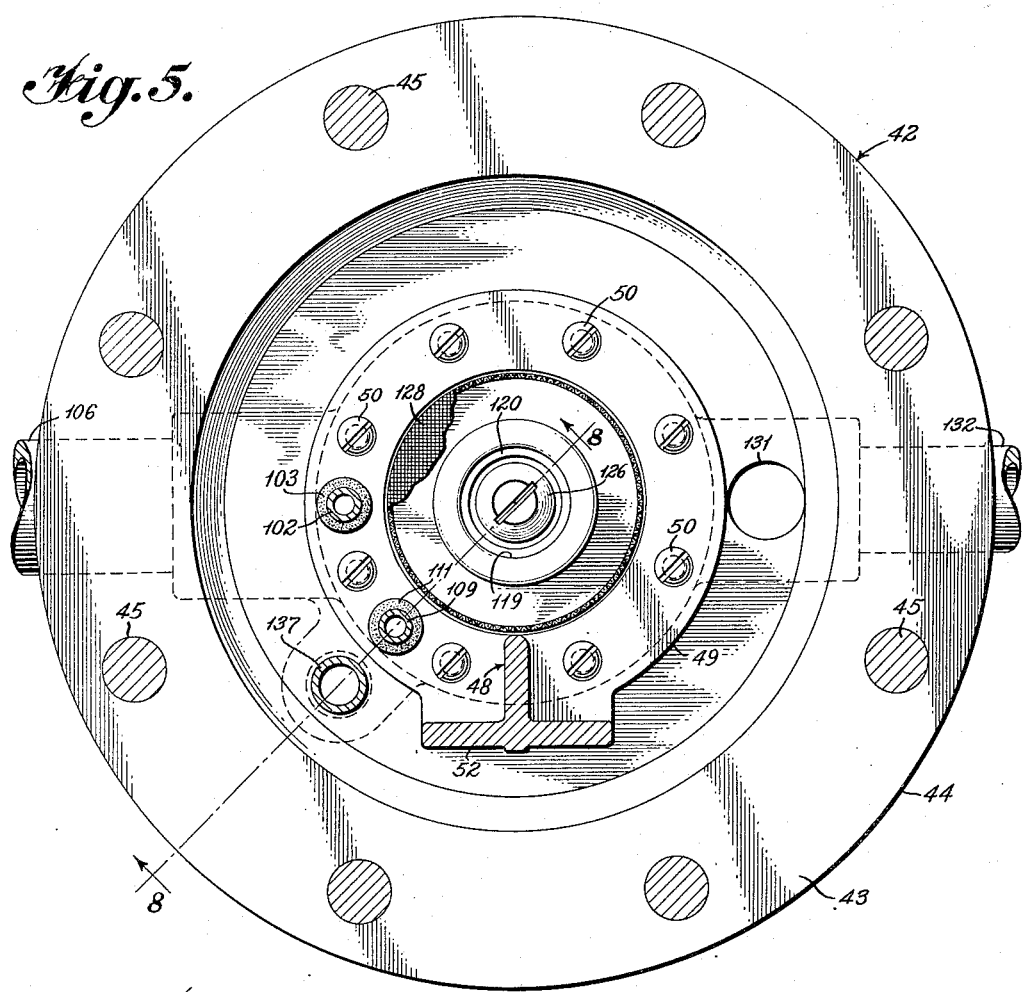
Fig. 5 is a horizontal section taken on the line 5—5 of Fig. 4 and showing the dump valve in plan view.
Figure 6:
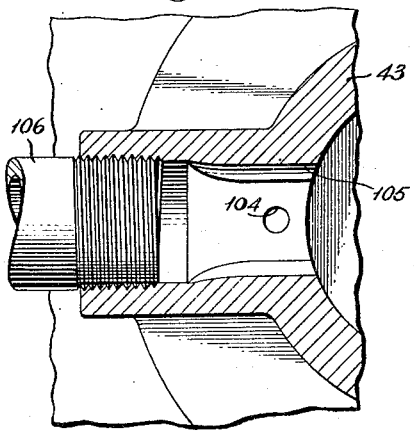
Fig. 6 is a fragmentary horizontal sectional view through the dump valve taken on the line 6—6 of Fig. 4.
Figure 7:
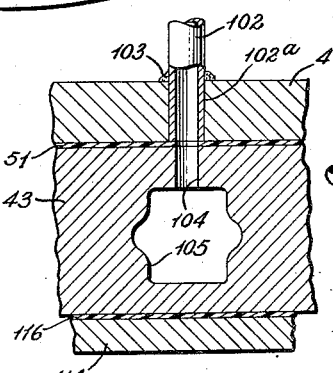
Fig. 7 is a fragmentary vertical sectional view through the dump valve taken on the line 7—7 of Fig. 4.

The dump valve 42, as is best shown in Fig. 4, comprises a body 43 having a horizontal flange 44 secured to the ring 40 by a plurality of studs 45 mounted in said ring, and nuts 46 mounted upon said studs. The studs 45 extend through a gasket 47, which is interposed between the ring 40 and the flange 44 and serves to provide a seal between said ring and flange. A bracket 48 has an annular base portion 49 disposed concentrically with the ring 40 and secured to the body 43 of the dump valve 42 by a plurality of screws 50, a gasket 51 being interposed between said base and body to provide a seal therebetween in the region of certain ports, as will be pointed out later. The bracket 48 includes an upright leg 52 that extends upwardly and to one side of the base 49, as best shown in Fig. 2. The upper end of the leg 52 includes a generally square, integral portion 53 that serves as a housing for the pilot valve P. The housing portion 53 includes a vertical face 55 bored to provide a pressure chamber 56. A strainer assembly 58, best shown in Fig. 15, includes a body 59 having a threaded extension 60 mounted in the opening 57. The body 59 has an axial passageway 61 extending therethrough and a plurality of grooves 62 are formed in the outer periphery thereof. Radial ports 63 connect the passageway 61 with the grooves 62. A cylindrical screen 64 surrounds the body 59 in the grooved region thereof and a metallic screen retainer disc 65 is mounted upon a shoulder portion 66 of said body and holds the screen 64 in place. The outer end of the passageway 61 is threaded and a screw 67 is mounted therein with its head engaging the disc 64 and securing said disc to the body 59. The purpose of the screen assembly 58 is to strain liquid that flows therethrough to the pressure chamber 56 of the pilot valve P to thus prevent foreign matter from entering said chamber.

Referring now to Fig. 4, the housing portion 53 has a journal opening 68 in which a shaft 69 is rotatably mounted. The bracket 48 is provided with an upwardly extending lug 70 having a journal opening 71 into which the shaft 69 projects, so that the shaft 69 is supported for rotation at two points. A driver 72 is disposed in the pressure chamber 56 and fixed to one end of the shaft 69. A pilot disc 73 is also disposed in the chamber 56 in axial alignment with the shaft 69. The outer periphery of the pilot disc 73 is cut away to receive a cylindrical skirt 74, which is soldered or brazed to the disc, as indicated at 75 and 76 in Fig. 18. The skirt 74 projects axially beyond the disc 73 and is provided with notches 77 for the reception of mating lugs 78 carried by the driver 72. The notches 77 and lugs 78 thus provide a positive driving connection between the shaft 69 and the pilot disc 73. The pilot disc is quite small in diameter, i. e., ½", so that only a small force is required to rotate it even when the pressure of the operating fluid is quite high. A compression spring 79 is disposed between the driver 72 and the pilot disc 73 and normally urges said disc into engagement with the seat 80 formed on a fluid distribution base 81. A thrust washer 82 is disposed between the driver 72 and the adjacent wall of the pressure chamber 56 to avoid wear which might otherwise occur between the driver 72 and the housing portion 53.

A float arm 83 is disposed between the housing portion 53 and the lug 70 and is fixedly secured to the shaft 69 by a screw 84 in the manner best illustrated in Fig. 14. The arm 83 has a threaded opening 85 that is offset on an angle of about 16½° from a line perpendicular to the axis of the shaft 69. A threaded stud 86 has one end thereof mounted in the opening 85 and its other end is secured to a ball float 87 by welding indicated at 88. The object of disposing the opening 85 at an angle with respect to the vertical plane of the float arm 83 is to provide for disposition of the float 85, substantially centrally within the cylindrical leg 38.

The distribution base 81 is substantially square in configuration, as best shown in Fig. 16, and is secured to the correspondingly square pilot valve housing 53 by a plurality of mounting screws 89. In the present construction, it is unnecessary to employ a gasket between the distribution base 81 and the pilot housing 53 since the pressure exteriorly of the chamber 56 is the same as that within said chamber. Likewise, it is unnecessary to provide a seal around the shaft 69 where it extends through the opening 68 in the pilot valve housing 53, since the pressures on the shaft are balanced. Thus, the cost of manufacturing the pilot valve is reduced and the assembly of the parts is facilitated.

The porting of the pilot disc 73 is best shown in Figs. 4, 18 and 20, and the porting of the fluid distribution base 81 is best shown in Figs. 4 and 16. Referring first to Figs. 4, 18 and 20, the pilot disc 73 has two through or pressure ports 90 and 91 spaced about 94° apart (Fig. 20), and an axial drain port 92. Radial drilled holes or ports 93 and 94 are spaced about 110° apart and about 78° from the nearest pressure ports 90 and 91, and intersect with the axial exhaust port 92 and these, in turn, are intersected by exhaust ports 95 and 96, respectively, disposed parallel with the exhaust port 92.

As best shown in Fig. 20, the pressure port 91 is disposed on a radial line $y$, about 4° to one side of a diametrical line $x$. On the other hand, the exhaust port 95 is disposed on a radial line $z$, about 4° from and on the same side of the diametrical line $x$ as the port 91. The other pressure port 90 is disposed on a radial line $y'$ lying about 82° counterclockwise about the center of and from the diametrical line $x$ and the other exhaust port 96 is disposed on a radial line $z'$ lying about 74° counterclockwise about the center of and from said diametrical line. It will be understood that the outer ends of the radial exhaust ports 93 and 94 are blocked by the skirt 74 so that operating fluid can flow through the pilot disc 73 from the pressure chamber 56 only upon entering either of the pressure ports 95 or 96.

The fluid distribution base 81 (Fig. 16) has an axial exhaust port 97 that is in constant communication with the axial exhaust port 92 of the pilot disc 73. Additional ports 98 and 99 are disposed upon a diametrical line $w$ on opposite sides of the exhaust port 97. The ports 97, 98, and 99 all extend inwardly into the base 81 from the face of the seat 80, as is clearly shown in Fig. 4. The ports 90, 91, 95 and 96 of the pilot disc 73 and the ports 98 and 99 of the fluid distribution base 81 are all disposed the same radial distance from the axis of the exhaust ports 92 and 97, respectively, so that certain of the disc ports can be brought into registration with the ports of the base upon suitable angular rotation of the pilot disc 73 relative to the seat 80, as will be explained more fully hereinafter.

The port 97 (Fig. 4) communicates with a passageway 100 in the base 81 and is threaded at its outer end and has a conventional fitting 101 mounted therein. One end of an exhaust conduit 102 is connected to the fitting 101 and its opposite end extends into an opening 102ᵃ in the base 49 of the bracket 48. The conduit 102 is connected to the bracket base 49 and is sealed against leakage relative to said base by soldering or brazing the same to the base as indicated at 103. The opening 102ª is vertically aligned with an exhaust port 104 in the body 43 of the dump valve 42 and communicates with an outlet passage 105 formed in said body. The gasket 51 prevents leakage between the body 43 and the bracket base 49 at the port 104. A pipe 106 has one end thereof threaded in the passage 105 for conducting fluid exhausted through the conduit 102 to the atmosphere or to a suitable drain.

The base port 99 (Figs. 4 and 16) communicates with the inner end of a vertical passageway 107 in the base 81 below the exhaust port 97, and the outer end of said passageway is threaded and has a conventional fitting 108 mounted therein. One end of a dump valve control conduit 109 is connected to the fitting 108 and the opposite end of said conduit projects into an opening 110, Fig. 8, extending through the bracket base 49, and is connected to said base by soldering or brazing 111. The opening 110 registers with a passageway 112 formed in the dump valve body 43, and the passageway 112, in turn, registers with a vertical port 113 formed in a cover 114 secured to the body 43 by a plurality of screws 115. A flexible diaphragm 116 is disposed between the body 43 and cover 114, the diaphragm 116 and cover 114 cooperating to provide a sealed chamber 117 for operating fluid under pressure. The chamber 117 and the port 113 are interconnected by an angular port 118 that intersects the port 113 adjacent its lower end.

The valve body 43 (Fig. 4) has an annular, upwardly projecting flange providing an inlet opening 119 disposed concentric with the bracket base 49 and extending through said base. An elongated cylindrical member 120 has the upper end thereof threaded into the lower end of the inlet opening 119 and its lower end 121 functions as a valve seat and separates the inlet opening 119 from the outlet opening 105. Washers 122 and 123 are disposed above and below the diaphragm 116 and serve to support the same. The washer 122 is adapted to be received in an opening 124 in the valve body 43 and is recessed on its upper side to receive a resilient valve disc 125. A bolt 126 extends through the valve disc 125, the washer 122, diaphragm 116 and washer 123, and secures these parts in assembled relation. A compression spring 127 is disposed between the washer 123 and the cover 114 and normally urges the disc 125 into engagement with the valve seat 121 to shut off flow through the valve 42. A cup-shaped screen or strainer 128 is centered with respect to the opening 119 by a boss 129 and has a flange 130 at its lower end which projects under the bracket base 49 and is maintained in assembled relation with the valve body 43 by said base. The purpose of the screen 128 is to prevent foreign matter from entering the dump valve 42.

The valve body 43, Fig. 4, has a drain passageway 131 opening into the sump chamber 39 and has an outlet in which one end of a pipe 132 is mounted. A manually operable drain valve 133 is connected in the pipe 132 and is adapted to be opened to blow down the chamber 39 to remove sludge or other foreign matter that may have collected therein.

Referring again to Figs. 4 and 16, the port 98 in the pilot base 81 communicates with the inner end of a vertical passageway 134 disposed above the exhaust port 97, the outer end of said passageway being threaded and having a conventional fitting 135 mounted therein. The fitting 135 is connected to one end of a section 136ª of a discharge valve control conduit 136, and the opposite end of said section is connected to a conventional fitting 137 mounted in the upper end of a threaded opening 138 formed in the valve body 43 on a radial line disposed outwardly of the passageway 112, as best shown in Fig. 8. A conventional T-fitting 139 has its stem connected with the lower end of the passageway 138 and one end of another section 136ᵇ of the discharge valve control conduit 136 is connected to one side of said fitting. The opposite end of the conduit section 136ᵇ is connected by a conventional fitting 140 to the cover 141 of an auxiliary control valve 142 for the discharge valve 14.

It will be understood from the foregoing that, the parts of the pilot valve P may be assembled with the bracket 48 and the conduits 102 and 109 soldered or otherwise connected to the base 49 of the bracket before the bracket is fastened by the screws 50 to the assembled dump valve 42. Thereafter, the conduit section 136ª may be connected to the pilot valve P and also to the fitting 137, so that a subassembly consisting of the bracket 48, the complete float-controlled pilot valve P, the conduits 102, 109 and 136ª, and the dump valve 42 can be mounted as a unit upon the ring 40 at the lower end of the chamber 39. The conduit section 136ᵇ can then be readily connected with the T-fitting 139 and with the fitting 140 to complete the connections between the pilot valve P and the valves controlled thereby.

The pilot valve P and its directly associated conduits are thus enclosed and protected from possible damage which might otherwise occur if the pilot valve were located exteriorly of the cylindrical leg 38. Moreover, the shortness of the float arm 83, and the incorporation of the pilot valve housing 53 as an integral part of the bracket 42 reduces the number of parts required and makes it possible to employ a cylindrical leg 38 of minimum diameter. The positioning of the pilot control means within the cylindrical leg also reduces the bulk of the apparatus, which is of extreme importance when the apparatus must be installed in limited space.

The valve 142 is shown in cross-section in Fig. 10 wherefrom it will be apparent that the valve comprises a body 143 having an outlet chamber 144 to which one end of a conduit 145 is connected by a conventional fitting 146. The opposite end of the conduit 145 is connected by a fitting 147 with the outlet chamber 16 of the discharge valve 14. The valve 142 has an inlet chamber 148 separated from the outlet chamber 144 by a partition 149 provided with a seat 150. The cover 141 is mounted on the valve body 143 by a plurality of screws 152, a flexible diaphragm 153 being interposed between the valve body and said cover. Diaphragm supporting washers 154 and 155 are arranged above and below the diaphragm 153, the lower washer 155 being recessed to receive a resilient valve disc 156. A screw 157 extends through the valve disc 156, the washer 155, the diaphragm 153 and is threaded into an opening 158 in the washer 154 for securing the valve disc and washers in assembled relation with the diaphragm 153. A compression spring 159 is disposed between the washer 154 and the cover 141 and normally urges the disc 156 toward the seat 150 to close the valve 142. The cover 141 is recessed and cooperates with the diaphragm 153 to provide a pressure chamber 160 to receive operating fluid from the discharge valve control conduit 136.

One end of a pipe nipple 161 (Fig. 10) is threaded into the inlet chamber 148 of the valve 142 and the opposite end of said nipple is threaded into an opening 152 in a plug 163. The plug 163 is threaded into a chamber 164 formed in a strainer housing 165 and said plug has an orifice 166 establishing communication between the chamber 164 and the pipe nipple 161. The housing 165 has a lateral opening 167 in which one end of a pipe 168 (Fig. 11) is mounted, the opposite end of said pipe being connected to the inlet chamber 13 of the discharge valve 14 by a fitting 169. The pipe 168 communicates with a chamber 170 in the housing 165 and a conventional strainer assembly 171 is threadedly mounted in said chamber. The chambers 164 and 170 are separated by a partition 172, and the strainer assembly 171 has a nozzle 173 that extends through the partition 172 in axial alignment with the orifice 166. A sealing ring 174 surrounds the nozzle 173 and forms a seal between the partition 172 and the adjacent wall of the strainer assembly 171. Thus, the pipe 168, nipple 161, and conduit 145 provide a bypass line in which the strainer housing 165 and the valve 142 are connected in series.

The housing 165 (Fig. 10) also has a threaded opening 175 on the upper side thereof in which a conventional fitting 176 is mounted. One end of a branch conduit 177 is connected to the fitting 176 and the opposite end of said conduit is connected by conventional fittings 178 (Fig. 13) with the pressure chamber 32 in the discharge valve 14. Thus, it will be seen that fluid can flow from the inlet chamber 13 of the valve 14 through the pipe 168, into the housing 165, through the strainer assembly 171, then through the conduit 177 to the pressure chamber 32 of the valve 14 to act upon the diaphragm 21 to effect closing of said valve. The foregoing is based upon the presumption that the valve 142 is closed, so that fluid cannot pass from the housing 165 through the valve 142 to the outlet chamber 16 of the valve 14, to thus be bypassed around the pressure chamber 32. The capacity of the valve 142, of course, is greater than that of the nozzle 173 and orifice 166, so that when the valve 142 is open, operating fluid for the valve 14 will merely be bypassed from the inlet chamber 13 of the valve 14 to the outlet chamber 16 of said valve, without flowing into the branch conduit 177. When the valve 142 is open, the nozzle 173 and orifice 166 function as an ejector to facilitate the withdrawal of operating fluid from the pressure chamber 32 of the valve 14 through the conduit 177 to effect quick opening of the discharge valve 14. Thus, the valve 14 will either be in an open state or closed, depending upon whether the bypass control valve 142 is opened or closed. The valve 142 is controlled by the pilot valve P, in a manner which will be described later.

The capacity of the nozzle 173 of the strainer 171 is also greater than that of the pressure port 90 of the pilot disc 73, so that the use of the valve 142 makes it possible to cause the discharge valve 14 to operate faster than it would if the supply and exhaust of operating fluid for the valve 14 were required to flow through the pilot valve. However, in installations where the discharge valve is small, it can be directly controlled by the pilot valve by connecting the conduit 136$^b$ to the pressure chamber 32 and omitting the bypass line containing the valve 142.

Referring now to Fig. 1, the pump 10$^a$ is driven by an electric motor 180 connected with the pump by a conventional coupling 181. A conduit 182 has one end thereof connected to one side of the T-fitting 139 and its opposite end is connected by a fitting 183 to the pressure chamber of a normally closed, conventional, pressure-responsive switch 184. A valve 185 is connected in the conduit 182 to render the switch ineffective, when this is desired. Conductors 186 and 187 are connected with the switch 184 and leads 186$^a$ and 187$^a$ connect the switch 184 to the motor 180. A switch 188 is connected in the circuit in parallel with the switch 184 for manually controlling the motor 180 independently of the switch 184.

One of the features of the present invention is that the operation of the pump 10$^a$ can be automatically controlled so that it will be shut off at times when an excess of the liquid having the greater specific gravity is present in the float chamber 39. The pump 10$^a$ can also be shut down substantially simultaneously with the closing of the discharge valve 14. Thus, as will be apparent from Fig. 1, the pressure of the operating fluid allowed to flow through conduit sections 136$^a$ and 136$^b$ to the pressure chamber of the control valve 142 is communicated through the conduit 182 to the pressure switch 184 for effecting opening of said switch to thereby interrupt the circuit to the motor 180 when the manual switch 188 is open. Thus, the closing of the discharge valve 14 will normally be accompanied by the opening of the pressure switch 184, so that the supply of fluid to the separator casing 2 will be stopped. Of course, and as will be explained later, the dump valve 42 is also open at such time and as the level of the heavy liquid H drops, the float 87 will be correspondingly lowered and rotate the pilot disc 73 through a corresponding angle. Eventually the pilot disc 73 will be positioned so that it will effect closing of the dump valve 42 and opening of the discharge valve 14, the latter resulting from the exhaust of operating fluid from the pressure chamber of the control valve 142. It will also be understood that, as the pressure drops in the conduit 136, the pressure switch 184 will automatically close and restart the motor 180 and drive the pump 10$^a$ to resume the supply of fluid to the casing 2.

It will be clear, from Figs. 4, 8, and 17, that when the pressure port 91 of the pilot disc 73 is in registration with the base port 99 (exaggerated in size in Fig. 17 to facilitate illustration), operating fluid under pressure can flow from the pressure chamber 56 of the pilot valve P through the dump valve control conduit 109, then through the passageway 112 in the valve body 43 and thence through the ports 113 and 118 and into the pressure chamber 117 to urge the diaphragm 116 upwardly and thereby move the valve disc 125 into engagement with the seat 121 to close the dump valve 42. At the same time, the exhaust port 95 of the pilot disc 73 substantially completely registers with the port 98 in the base 81, so that operating fluid is exhausted from the pressure chamber 160 of the bypass valve 142, through the conduit sections 136$^b$ and 136$^a$ of the discharge valve control conduit 136, thence through the port 98 in the base 81, through the exhaust passage in the pilot disc 73 provided by the ports 92, 93 and 95, into the exhaust port 97 of the pilot valve base 81, thence through the exhaust conduit 102, and into the exhaust port 104 and outlet passage 105 in the valve body 43 for ultimate discharge through the waste pipe 106. Thus, the operating fluid bypass control valve 142 is allowed to open so that operating fluid under pressure normally derived from the inlet chamber 13 of the discharge valve 14 is bypassed to the outlet chamber 16 of the valve 14, instead of flowing to the pressure chamber 32 of the valve 14 through the branch conduit 177. Actually, and as indicated hereinbefore, when the bypass valve 142 is open, the nozzle 173 and the orifice 166 function as an ejector to rapidly withdraw operating fluid from the pressure chamber 32 to allow the valve 14 to open quickly. Thus, when the pilot disc 73 is in the position illustrated in Fig. 17, the discharge valve 14 is open and the dump valve 42 is closed. The conduit 182 is open to exhaust so that the pressure switch 184 is closed. This position of the pilot disc 73 corresponds to the full "down" position of the float 87 corresponding to a level of the heavy liquid H indicated at A in Fig. 1. In this connection, downward movement of the float 87 is limited by the engagement of the float arm 83 with a milled surface 179 on the bracket 48, as shown in dot-and-dash lines in Fig. 2, the pilot disc 73 then actually being in the position relative to the seat 80 shown in Fig. 4.

The dump valve 42 will remain closed and the discharge valve 14 will remain open so long as the level of the water or heavier liquid H in the float chamber 39 lies between the planes indicated by the lines A and B. When the water level has reached the plane B, the float arm 83 will have moved through an angle of about 45° or sufficient to effect rotation of the pilot disc 73 counterclockwise, as viewed in Fig. 19, from its lowermost operative position shown in Fig. 17 to an intermediate position in which the exhaust ports 95 and 96 of said pilot disc are positioned intermediate the ports 98 and 99 in the base 81 of the pilot valve so that operating fluid under pressure is neither exhausted from nor supplied to the pressure chamber 117 of the dump valve 42, thus maintaining the dump valve closed, and the pressure chamber 160 of the bypass valve 142 remains in a condition of exhaust so that the discharge valve, which it controls, also remains open.

Should the water level in the float chamber 39 continue to rise to a level above the plane B, the pilot disc 73 will be further rotated in a clockwise direction to another intermediate position in which the exhaust port 96 will begin to overlap the base port 99, as will be readily visualized from Fig. 19, to exhaust operating fluid from the pressure chamber 117 of the dump valve 42 and allow said valve to open to drain water from the sump chamber 39 through the pipe 106. The exhaust port 96 will register with the base port 99 through about an 8° movement of the float arm 83, corresponding to a rise in water level to the plane C, Fig. 1, before the pressure port 90 starts to overlap the base port 98. In other words, while the water level is rising from the level B to the level C, the dump valve 42 is allowed to open, while the discharge valve 14 continues to remain open. However, should the water level rise above the plane C, the pressure port 90 will begin to overlap with the base port 98, and when the water level reaches the plane D, the pilot disc 73 will assume the position shown in Fig. 21, corresponding to the upper limit of travel of the float 87. It will be noted from Fig. 2 that this upper limit is determined by the engagement of the float 87 with the screen retainer disc 65, as shown in dot-and-dash lines. The float arm 83 thus travels through a maximum angle of about 78° from its initial position.

It will be observed from Fig. 21 that the exhaust port 96 now completely registers with the port 99 in the pilot valve base 81 (the port 99 being exaggerated in size to facilitate illustration), and that the pressure chamber 117 of the dump valve 42 is open to exhaust to allow the dump valve 42 to remain open; whereas, the pressure port 90 of the pilot disc 73 now substantially registers with the base port 98 to supply operating fluid under pressure through the discharge valve control conduit 136 to the pressure chamber 160 of the bypass valve 142, thereby effecting closing of said bypass valve and causing operating fluid under pressure delivered through the nozzle 173 of the strainer 171 to pass through the branch conduit 177 to the pressure chamber 32 of the discharge valve 14 to effect closing of said discharge valve, in the manner previously described.

It will also be apparent that simultaneous with the supply of operating fluid to the valve 142, pressure will be communicated to the pressure switch 184 to shut off the pump 10ª, as also has been previously described. Of course, as the water level in the sump chamber 39 drops, the float 87 will be lowered, reversing the cycle of operation of the apparatus, i. e., resumption of the operation of the pump 10ª, and closing of the dump valve 42 about 8° of movement of the float arm 83 in advance of the opening of the discharge valve 14.

Extremely sensitive operation of the gasoline water separation apparatus is effected at all times by having the float chamber 39 in direct communication with the lower part of the casing 2, so that there is no restriction in flow therebetween. This arrangement requires the float 87 to operate the pilot valve P in exact accord with variations in the volume of water separated from the gasoline and collected in the sump chamber 39. Great sensitivity of operation is also effected by the use of a pilot valve P having a small disc requiring very little force to rotate the same. The pilot disc shaft 69 is directly connected with the arm 83 of the float 87 so that the disc must rotate through the same angle traversed by the float arm, as the water level in the sump chamber 39 varies. Such sensitive operation of the control means is essential in order to control the valves 14 and 42 to effect efficient and rapid separation of the water from the gasoline.

It will be understood that various changes may be made in the details of construction of the liquid separating apparatus disclosed herein, and in the details of the control means provided for automatically and simultaneously controlling the operation of the discharge and dump valves, as well as the motor that drives the pump, without departing from the principles of the invention or the scope of the annexed claims.

I claim:

1. Apparatus for separating two immiscible liquids, one of which has a greater specific gravity than the other, comprising: a separator casing having an inlet for said liquids and an outlet for the lighter of said liquids; means providing a chamber communicating with said casing in which heavier liquid collects; closure means closing the lower end of said chamber including a dump valve having an inlet, opening into the interior of said chamber and an outlet, opening exteriorly of said chamber, said dump valve being fluid pressure operable and adapted to drain the heavier liquid from said chamber; and means in said chamber including a pilot valve responsive to variations in the level of the heavier liquid for controlling the supply of operating fluid to, and the exhaust of operating fluid from, said dump valve for controlling the opening and closing of said dump valve in accordance with variations in the level of the heavier liquid in said chamber.

2. Apparatus for separating two immiscible liquids, one of which has a greater specific gravity than the other, comprising: a separator casing having an inlet for said liquids and an outlet for the lighter of said liquids; a fluid pressure operable discharge valve connected with said outlet for controlling the discharge of the lighter liquid from said casing; means providing a chamber communicating with said casing in which heavier liquid collects; closure means for the lower end of said chamber including a dump valve having an inlet, opening into the interior of said chamber and an outlet, opening exteriorly of said chamber, said dump valve being fluid pressure operable and adapted to drain the heavier liquid from said chamber; conduit means for supplying operating fluid from within said chamber to said discharge valve and means in said chamber responsive to variations in the level of the heavier liquid for simultaneously controlling the supply of operating fluid to, and the exhaust of operating fluid from, said discharge and dump valves for controlling the opening and closing of said discharge and dump valves in accordance with variations in the level of the heavier liquid in said chamber.

3. Apparatus for separating two immiscible liquids, one of which has a greater specific gravity than the other, comprising: a separator casing having an inlet for said liquids and an outlet for the lighter of said liquids; a fluid pressure operable discharge valve connected with said outlet for controlling the discharge of the lighter liquid from said casing, said discharge valve having a pressure chamber for operating fluid; fluid pressure operable means controlling the opening and closing of said discharge valve; means providing a chamber communicating with said casing in which heavier liquid collects; closure means for the lower end of said chamber including a dump valve having an inlet, opening into the interior of said chamber and an outlet, opening exteriorly of said chamber, said dump valve being fluid pressure operable and adapted to drain the heavier liquid from said chamber; and means including a pilot valve in said chamber responsive to variations in the level of the heavier liquid for simultaneously controlling the supply of operating fluid to and the exhaust of operating fluid from said dump valve and from the fluid pressure operable means controlling said discharge valve for controlling the opening and closing of said dump and discharge valves in accordance with variations in the level of the heavier liquid in said chamber.

4. Apparatus as defined in claim 3, wherein the discharge valve has an inlet and an outlet chamber and the fluid pressure operable means for controlling the discharge valve includes a bypass line interconnecting the inlet and outlet chambers of said discharge valve, a bypass valve connected in said bypass line, and a branch conduit connected with the pressure chamber of the discharge valve and with said bypass conduit at a point ahead of said bypass valve so that when the bypass valve is opened operating fluid will be bypassed around the pressure chamber of said discharge valve and when said bypass valve is closed operating fluid under pressure will flow from the inlet chamber of said discharge valve through the branch conduit to the pressure chamber of said discharge valve.

5. Apparatus for separating two immiscible liquids, one of which has a greater specific gravity than the other, comprising: a separator casing having an inlet for said liquids and an outlet for the lighter of said liquids; a motor driven pump connected with said inlet for supplying liquids thereto; a circuit for said motor including a normally closed pressure switch; a fluid pressure operable discharge valve connected with said outlet for controlling the discharge of the lighter liquid from said casing; fluid pressure operable means controlling the opening and closing of said discharge valve; means providing a chamber communicating with said casing and in which heavier liquid collects; closure means for said chamber including a dump valve having an inlet, opening into the interior of said chamber and an outlet, opening exteriorly of said chamber, said dump valve being fluid pressure operable and adapted to drain the heavier liquid from said chamber; means including a pilot valve in said chamber responsive to variations in the level of the heavier liquid for simultaneously controlling the supply of operating fluid to said pressure switch and said fluid pressure operable means controlling said discharge valve and the exhaust of operating fluid from said dump valve for simultaneously effecting opening of said dump valve, closing of said discharge valve, and interruption of the circuit to said motor in accordance with variations in the level of the heavier liquid in said chamber.

6. Fluid separation apparatus, comprising: separator casing means having an inlet and an outlet; pump means for supplying fluid to said inlet; means for driving said pump means; pressure responsive means controlling the operation of said drive means; a fluid pressure operable discharge valve connected with the outlet of said casing means; and means responsive to variations in level of the heavier liquid in said casing means for simultaneously supplying operating fluid under pressure to said discharge valve to effect closing thereof and to said pressure responsive means for disabling said drive means.

7. Fluid separation apparatus, comprising: separator casing means having an inlet, an outlet and a sump for a heavy liquid; pump means for supplying fluid to said inlet; means for driving said pump means; pressure responsive means controlling the operation of said drive means; a fluid pressure operable dump valve connected with the sump of said casing means; and means responsive to variations in level of the heavier liquid in said casing means for substantially simultaneously supplying operating fluid under pressure to said pressure responsive means for disabling said drive means and exhausting operating fluid from said dump valve to effect opening thereof.

8. Apparatus for separating fluids, comprising: a separator casing having an inlet for said fluids and having an outlet for the lighter of said fluids; means providing a chamber communicating with said casing and in which heavier fluid collects, said chamber having an outlet for said heavier fluid; a fluid pressure operable dump valve for the heavier liquid having an inlet communicating with the outlet of said chamber; a pump for supplying fluids to the inlet of said casing; an electric motor connected with said pump for driving the same; an electrical circuit for said motor including a normally closed, fluid pressure operable switch; means responsive to variations in the level of the heavier fluid in said chamber controlling the supply of operating fluid under pressure to said dump valve and pressure switch for simultaneously effecting opening of said dump valve and opening of said pressure switch.

9. Apparatus for separating fluids, comprising: a separator casing having an inlet for said fluids and having an outlet for the lighter of said fluids; means providing a chamber communicating with said casing and in which heavier fluid collects, said chamber having an outlet for said heavier fluid; a fluid pressure operable discharge valve for the lighter liquid connected with the outlet of said casing and a fluid pressure operable dump valve for the heavier liquid forming a closure for the outlet of said chamber; a pump for supplying fluids to said inlet; an electric motor connected with said pump for driving the same; an electrical circuit for said motor including a fluid pressure operable switch; means responsive to variations in the level of the heavier fluid for simultaneously controlling the supply of operating fluid under pressure to and exhaust of said operating fluid from said discharge and dump valves for simultaneously controlling the opening and closing of said discharge and dump valves in accordance with variations in the level of the heavier fluid in said chamber, said pressure switch being actuatable to open position by said operating fluid simultaneously with the supply of operating fluid for effecting closing of said discharge valve.

10. Apparatus for separating two immiscible liquids, one of which has a greater specific gravity than the other, comprising: a separator casing having an inlet for said liquids and an outlet for the lighter of said liquids; means providing a chamber communicating with said casing and in which heavier liquid collects, said chamber having an outlet end for said heavier liquid; means forming a closure for said outlet end including a dump valve having a body obstructing said outlet end and having an inlet opening into the interior of said chamber and an outlet located exteriorly of said chamber; and means responsive to variations in the level of the heavier liquid for controlling the opening and closing of said dump valve in accordance with variations in the level of the heavier liquid in said chambers.

11. In a fluid separation apparatus, a casing; a member depending from said casing and forming a sump, the upper end of said member being in continuous communication with said casing; closure means for the lower end of said member; a pilot valve disposed in said sump, said pilot valve including a body having a pressure chamber for operating fluid; a strainer mounted upon said body communicating with said pressure chamber and through which operating fluid can flow from said sump directly into said pressure chamber; a fluid pressure operable dump valve, for draining the heavier fluid from said sump, having a body forming a part of said closure means; means establishing communication between said pilot valve and the pressure chamber of said dump valve and enabling said pilot valve to control the opening and closing of said dump valve; and float means in said sump for actuating said pilot valve in accordance with changes in the level of the heavier fluid in said sump.

12. Apparatus for separating two immiscible liquids, one of which has a greater specific gravity than the other, comprising: a separator casing having an inlet for said liquids and an outlet for the lighter of said liquids; means providing a chamber communicating with said casing and in which heavier liquid collects and having an outlet for said heavier liquid; means forming a closure for said outlet including a ring at the lower end of said chamber, and a dump valve having a body secured to said ring and obstructing flow through said ring, said dump valve having an inlet opening at the upper side of said body communicating with said chamber and having an outlet located exteriorly of said chamber.

13. Apparatus for separating two immiscible liquids, one of which has a greater specific gravity than the other, comprising: a separator casing having an inlet for said liquids and an outlet for the lighter of said liquids; means providing a chamber communicating with said casing and in which heavier liquid collects and having an outlet for said heavier liquid; means forming a closure for said outlet including a ring at the lower end of said chamber and a dump valve having a body secured to said ring and obstructing flow through said ring, said dump valve having an inlet opening at the upper side of said body communicating with said chamber and having an outlet located exteriorly of said chamber; fluid pressure operable means controlling the flow between said inlet and outlet of said dump valve; and means in said chamber operable in response to variations in the level of the heavier liquid for controlling the supply and exhaust of operating fluid to said dump valve in accordance with variations in the level of the heavier liquid in said chamber to control the opening and closing of said dump valve.

14. Apparatus for separating two immiscible liquids, one of which has a greater specific gravity than the other, comprising: a separator casing having an inlet for said liquids and an outlet for the lighter of said liquids; means providing a chamber communicating with said casing and in which heavier liquid collects and having an outlet for said heavier liquid; means forming a closure for said outlet including a ring at the lower end of said chamber and a fluid pressure operable valve including a body having a mounting flange secured to said ring, said valve body obstructing flow through said ring and having an inlet opening accessible from the chamber side of said flange and having an outlet opening accessible from the other side of said flange, said dump valve including a fluid pressure operable element controlling flow between said openings and a pressure chamber for operating fluid for actuating said element; a strainer within said chamber overlying said inlet opening; means surrounding said inlet opening and securing said strainer on said body, said body also having a drain passageway having its inlet accessible from said chamber side of said flange and having its outlet accessible from said other side of said flange; and means in said chamber operable in response to variations in the level of the heavier liquid for controlling the supply and exhaust of operating fluid to said dump valve in accordance with variations in the level of the heavier liquid in said chamber to control the opening and closing of said dump valve.

15. Apparatus for separating two immiscible liquids, one of which has a greater specific gravity than the other, comprising: a separator casing having an inlet for said liquids and an outlet for the lighter of said liquids; means providing a chamber communicating with said casing and in which heavier liquid collects, said chamber having an outlet end for said heavier liquid; means forming a closure for said outlet end, including a fluid pressure operable dump valve having a body provided with an inlet opening communicating with the interior of said chamber, an outlet opening communicating with the exterior of said chamber, a fluid pressure operable element controlling flow between said inlet and outlet openings, and a pressure chamber for operating fluid for actuating said element; a strainer in said chamber overlying said inlet opening; a bracket mounted on said body having an annular base surrounding said inlet opening and securing said strainer element on said body; a pedestal extending upwardly from said base; a pilot valve on the upper end of said pedestal, said pilot valve having an inlet for receiving operating fluid from said chamber; a conduit for said operating fluid having one end connected with an outlet of said pilot valve and its opposite end received in an opening extending through said bracket base, said valve body having passage means registering with said last-mentioned opening for supplying operating fluid to said dump valve for actuating said closure element; a second conduit having one end connected with said pilot valve and its opposite end received in a second opening extending through said bracket base, said valve body having passage means registering with said second opening and establishing communication between said second conduit and said outlet of said dump valve; and means responsive to variations in the level of the heavier liquid in said chamber for controlling the operation of said pilot valve in accordance with variations in the level of the heavier liquid in said chamber.

References Cited in the file of this patent

UNITED STATES PATENTS

| | | |
|---|---|---|
| 680,852 | Foster | Aug. 10, 1901 |
| 763,741 | Ellis | June 28, 1904 |
| 1,017,178 | Selin | Feb. 13, 1912 |
| 1,948,543 | Samiran | Feb. 27, 1934 |
| 1,987,666 | Carlson | June 15, 1935 |
| 2,193,720 | Griswold | Mar. 12, 1940 |
| 2,417,994 | Sheets | Mar. 25, 1947 |
| 2,452,615 | Thomson | Nov. 2, 1948 |
| 2,525,154 | Taylor | Oct. 10, 1950 |
| 2,597,475 | Grise | May 20, 1952 |
| 2,609,099 | Griswold | Sept. 2, 1952 |